(12) United States Patent
Abe et al.

(10) Patent No.: US 8,875,966 B2
(45) Date of Patent: Nov. 4, 2014

(54) CONNECTING ROD BREAKING METHOD

(75) Inventors: Mami Abe, Tajimi (JP); Junji Yokota, Chiryu (JP); Michitaka Okugawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 148 days.

(21) Appl. No.: 13/513,866

(22) PCT Filed: Jan. 24, 2011

(86) PCT No.: PCT/JP2011/051247
§ 371 (c)(1),
(2), (4) Date: Jun. 5, 2012

(87) PCT Pub. No.: WO2012/101748
PCT Pub. Date: Aug. 2, 2012

(65) Prior Publication Data
US 2012/0267413 A1    Oct. 25, 2012

(51) Int. Cl.
*B26F 3/00* (2006.01)
*F16C 9/04* (2006.01)
*F16C 41/00* (2006.01)

(52) U.S. Cl.
CPC ............... *F16C 9/045* (2013.01); *F16C 41/008* (2013.01)
USPC .............................................. 225/2; 225/96

(58) Field of Classification Search
CPC ............. B26F 3/00; B26F 3/02; B26H 35/00; B23P 19/04; B23P 17/02; B23P 15/00; B23P 17/00; B23P 19/00; F16C 9/045; F16C 7/03; F16C 19/00; B21D 53/10
USPC ............ 225/2, 96, 103, 1, 96.5, 104, 105, 94, 225/100, 101, 97; 29/239, 888.09, 46, 413, 29/416, 149.5, 426.5, 426.4
See application file for complete search history.

(56) References Cited

U.S. PATENT DOCUMENTS

| | | | | |
|---|---|---|---|---|
| 2,703,263 A | * | 3/1955 | Zernov | 384/430 |
| 3,818,577 A | * | 6/1974 | Bailey et al. | 29/413 |
| 3,994,054 A | * | 11/1976 | Cuddon-Fletcher et al. | 29/888.09 |
| 4,684,267 A | * | 8/1987 | Fetouh | 384/294 |
| 4,923,674 A | | 5/1990 | Weber | |

(Continued)

FOREIGN PATENT DOCUMENTS

| | | |
|---|---|---|
| CN | 101352795 A | 1/2009 |
| JP | 1 272705 | 10/1989 |

(Continued)

OTHER PUBLICATIONS

International Search Report Issued Feb. 15, 2011 in PCT/JP11/51247 Filed Jan. 24, 2011.

*Primary Examiner* — Ghassem Alie
(74) *Attorney, Agent, or Firm* — Oblon, Spivak, McClelland, Maier & Neustadt, L.L.P.

(57) ABSTRACT

A notch is formed in an inner circumference of a bolt hole formed on each side of a large end of the connecting rod such that the notch extends continuously along the inner circumference. By radially propagating progress of breakage from the notch as a starting point, a connecting rod is broken into a rod portion and a cap portion. In this case, since no confluence of breakage propagation exists, the connecting rod can be broken without generating any breaking surface step.

7 Claims, 10 Drawing Sheets

(56) References Cited

U.S. PATENT DOCUMENTS

| | | | |
|---|---|---|---|
| 6,474,526 B1 * | 11/2002 | Hahnel et al. | 225/100 |
| 6,641,016 B2 * | 11/2003 | Hahnel et al. | 225/103 |
| 7,143,915 B2 * | 12/2006 | Guirgis | 225/2 |
| 2002/0023939 A1 * | 2/2002 | Hase | 225/2 |
| 2005/0011924 A1 * | 1/2005 | Momose et al. | 225/1 |
| 2006/0260433 A1 | 11/2006 | Kubota et al. | |
| 2008/0061100 A1 * | 3/2008 | Hansch et al. | 225/96 |

FOREIGN PATENT DOCUMENTS

| | | |
|---|---|---|
| JP | 2004 245237 | 9/2004 |
| JP | 2005 14094 | 1/2005 |
| JP | 2005 106271 | 4/2005 |
| JP | 2006 150472 | 6/2006 |
| JP | 2006 322599 | 11/2006 |
| JP | 2007 529694 | 10/2007 |
| JP | 2010 71438 | 4/2010 |

\* cited by examiner

Fig.11(a)(Prior Art)
Fig.11(b) (Prior Art)
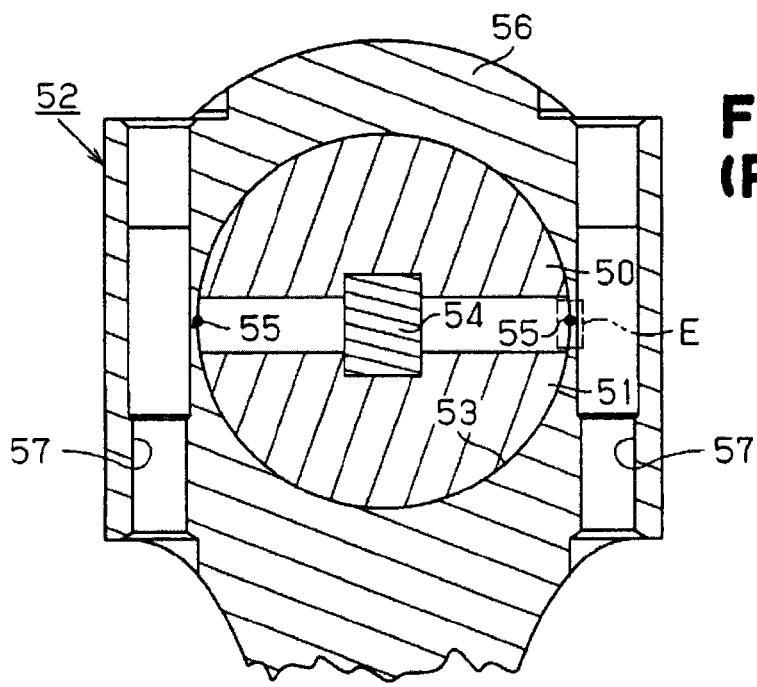
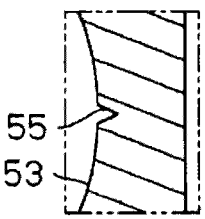
Fig.12(Prior Art)
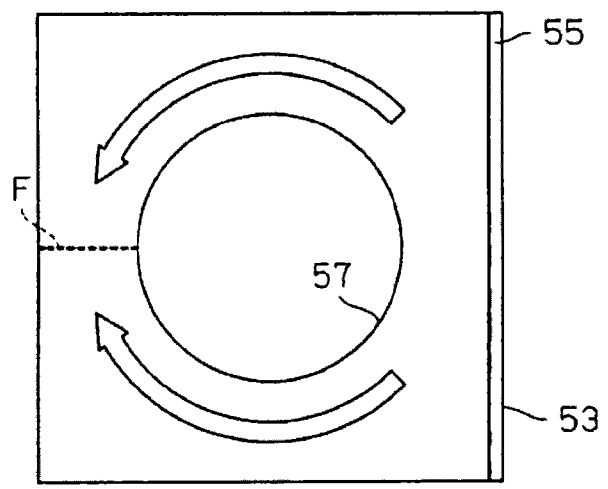

CONNECTING ROD BREAKING METHOD

FIELD OF THE DISCLOSURE

The present invention relates to a method for breaking an integrally molded connecting rod including a large end having a large end hole into which a crank shaft is inserted into a rod portion and a cap portion at the large end.

BACKGROUND OF THE DISCLOSURE

A connecting rod that couples an engine crank shaft to a piston has one end as a small end, in which a small end hole pivotally supporting a piston pin is formed and the other end as a large end in which a large end hole pivotally supporting a journal portion of the crank shaft. Generally, in manufacturing, such a connecting rod is integrally molded by forging and is then broken into a rod portion and a cap portion at the large end.

Conventionally, as disclosed in Patent Documents 1 to 3, the connecting rod is broken by first forming a breakage-promoting wedge-shaped groove (notch) in an inner circumference of the large end hole. Then, as shown in FIG. 11, two-way split molds 50, 51 are inserted into a large end hole 53 of a connecting rod 52, and a wedge 54 is driven between the split molds 50, 51 to separate the split molds 50, 51 from each other, thereby causing breakage using as a starting point a notch 55 formed in the inner circumference of the large end hole 53.

PRIOR ART DOCUMENT

Patent Document

Patent Document 1: Japanese Laid-Open Patent Publication No. 2005-106271
Patent Document 2: Japanese Laid-Open Patent Publication No. 2006-150472
Patent Document 3: Japanese Laid-Open Patent Publication No. 2005-014094

SUMMARY OF THE INVENTION

Problems that the Invention is to Solve

A bolt hole 57 for fastening the rod portion and the cap portion of the connecting rod 52, which are divided by breaking, is formed on each side of a large end 56 as a breaking region. Thus, as shown in FIG. 12, progress of breakage starting at the notch 55 independently propagates in a direction of going around the bolt hole 57 clockwise and in a direction of going around the bolt hole 57 counterclockwise. In such a case, positions of progress of breakage in the directions may be displaced from each other at a confluence F between breakage propagation in both directions, and as shown in FIG. 13, in a forming mode of a breaking line G at this time, a breaking surface step H may be formed. Such a breaking surface step H deteriorates yields of the connecting rod 52.

The present invention is made in consideration of such circumstance, and its objective is to provide a connecting rod breaking method capable of performing breaking without generating a breaking surface step.

Means for Solving the Problems

The present invention provides a method for breaking an integrally molded connecting rod into a rod portion and a cap portion in a large end in which a large end hole is formed. The method includes: forming a notch in an inner circumference of a bolt hole, which is formed on each side of the large end and into which a bolt for fastening the rod portion and the cap portion to each other is inserted, such that the notch extends continuously along the inner circumference; and performing the breaking by radially propagating progress of breakage from the notch as a starting point.

According the above-mentioned method, using the notch formed in the inner circumference of the bolt hole as the starting point, progress of breakage radially proceeds from the inner circumference. For this reason, no confluence of breakage propagation exists. Accordingly, according to the above-mentioned breaking method, the connecting rod can be broken without generating any breaking surface step.

Breaking of the connecting rod can be performed by, for example, a step of forming a notch, a step of inserting split mold into a bolt hole, and a step of applying a load to the split mold to press the notch in a radial direction, thereby breaking the connecting rod into a rod portion and a cap portion. In this case, it is possible to use the split mold that is annular and has a wedge-like projection inserted into the notch on its outer circumference. By dividing such a split mold into two and driving a wedge between two parts constituting the split mold to widen the distance between the portions, the connecting rod can be broken easily and accurately.

Since the connecting rod is independently broken on both sides of the large end, a time difference may occur in breaking on the sides. Buckling may occur depending on the time difference. By breaking the connecting rod in a state where the sides of the large end are kept by a cap guide, such buckling is prevented.

BRIEF DESCRIPTION OF THE DRAWINGS

FIG. 11(a) is a cross-sectional view showing a conventional connecting rod breaking mode;
FIG. 11(b) is an enlarged view of a section E in FIG. 11(a);

FIG. 12 is a cross-sectional view showing a breakage progress propagating mode in a conventional connecting rod breaking method.

DETAILED DESCRIPTION OF THE PREFERRED EMBODIMENTS

First Embodiment

Figure 1:
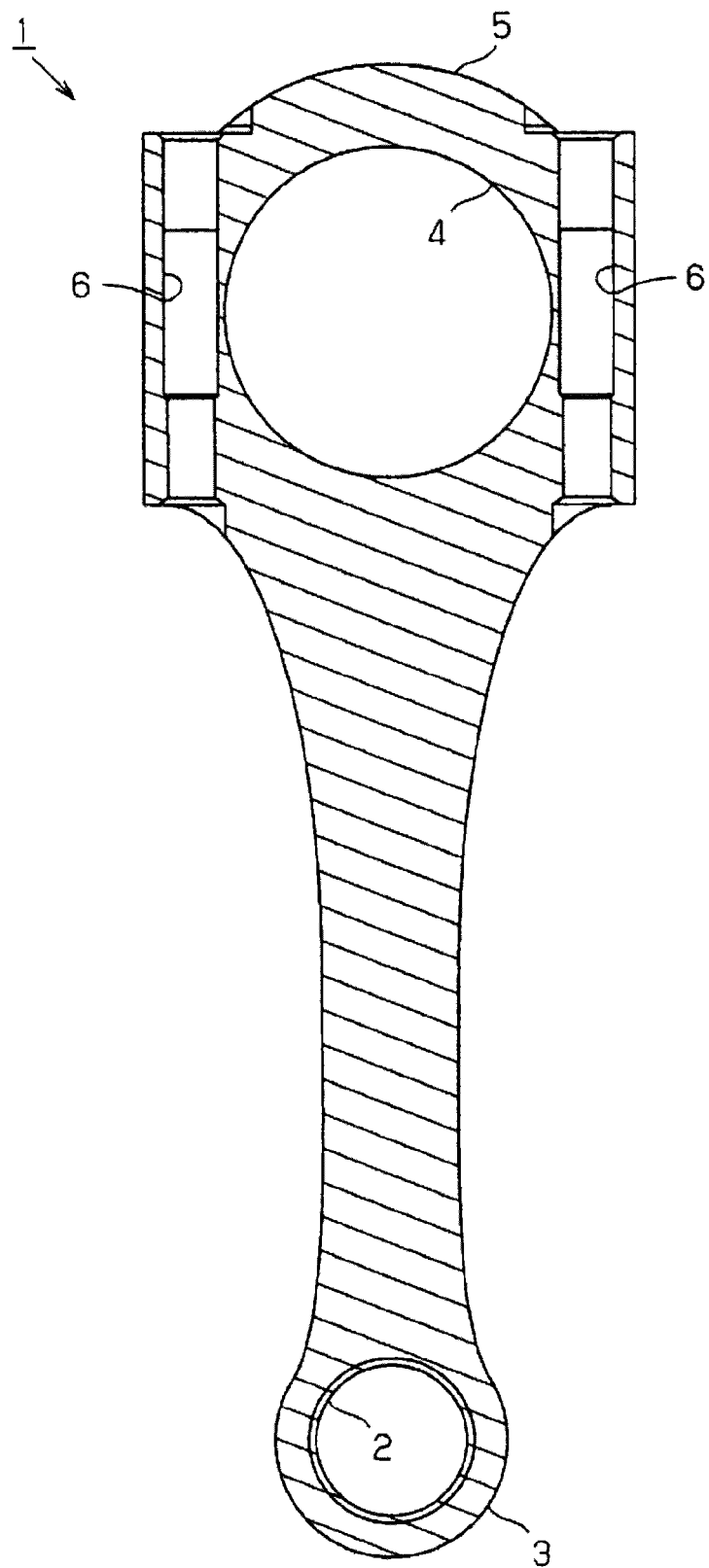
FIG. 1 is a cross-sectional plan view showing a connecting rod to be broken in a first embodiment of the present invention.

A connecting rod breaking method according a first embodiment of the present invention will be described in detail with reference to FIGS. 1 to 8. As shown in FIG. 1, a connecting rod 1 to be broken is integrally molded by forging so as to have one end as a small end 3, in which a small end hole 2 pivotally supporting a piston pin is formed, and the other end as a large end 5, in which a large end hole 4 pivotally supporting a journal portion of a crank shaft is formed. A bolt hole 6, into which a bolt for fastening the cap portion and the rod portion of the connecting rod 1, which are divided by breaking, is formed at each side of the large end 5.

The connecting rod 1 is manufactured by breaking an integral mold formed by forging into the cap portion and the rod portion in the large end 5. In this embodiment, the connecting rod 1 is broken through the following steps 1 to 3.

Step 1: forming a notch that extends continuously along the inner circumference of the bolt hole 6 on each side of the large end 5.

Step 2: inserting a split mold into each bolt hole 6.

Step 3: applying a load to each split mold to press the notch in a radial direction, thereby breaking the connecting rod 1 into the rod portion and the cap portion.

Figure 2A:
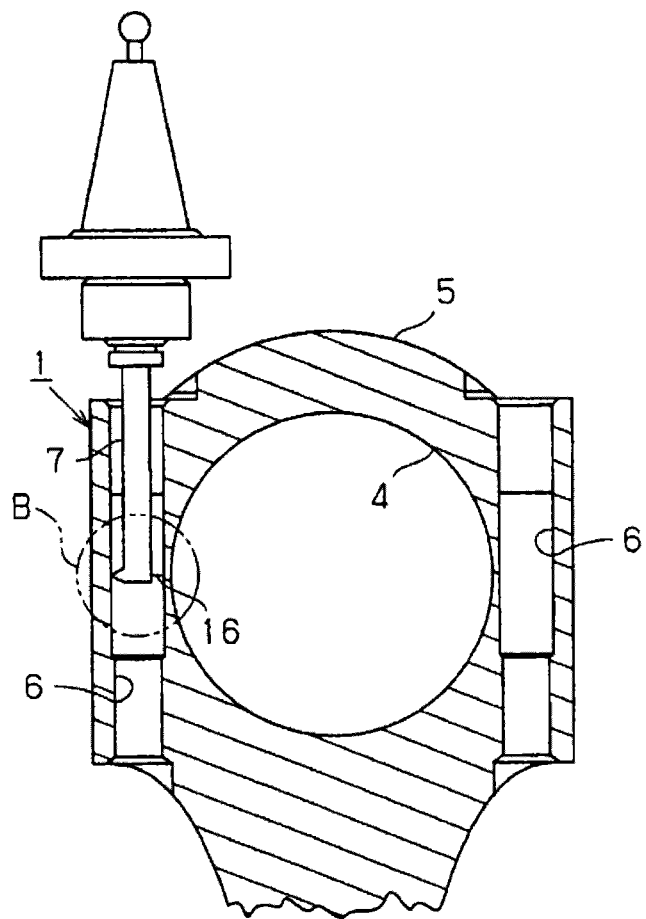
FIG. 2(a) is a cross-sectional view showing a notch forming mode in this embodiment.
Figure 2B:
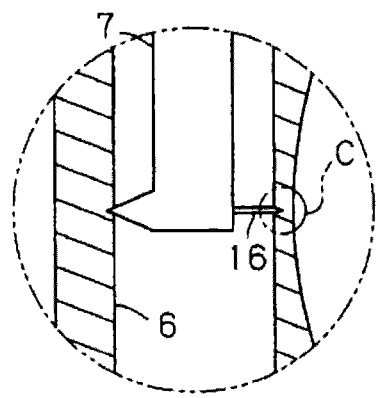
FIG. 2(b) is an enlarged view showing a section B in FIG. 2(a)
Figure 2C:
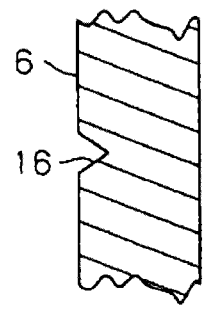
FIG. 2(c) is an enlarged view showing a section C in FIG. 2(b)
Figure 3:
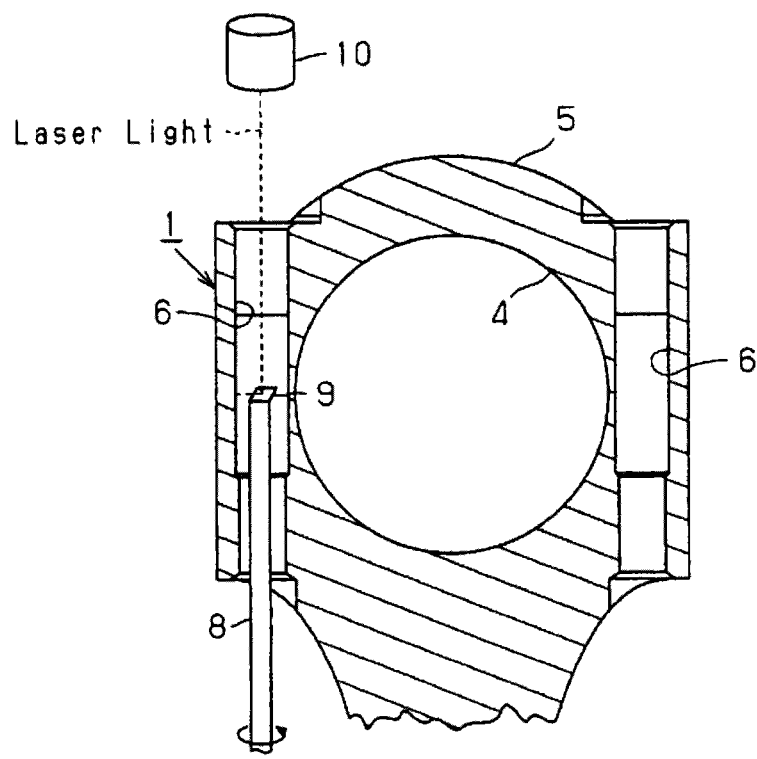
FIG. 3 is a cross-sectional view showing another notch forming mode in this embodiment.

Forming of the notch in Step 1 can be performed, for example, in a mode shown in FIG. 2(a). That is, a single point tap 7 is inserted into the bolt hole 6 and is rotated so that its edge goes around the inner circumference of the bolt hole 6, thereby forming the notch 16 that extends continuously along the inner circumference of the bolt hole 6. FIG. 2(b) is an enlarged view of a section B in FIG. 2(a), and FIG. 2(c) is an enlarged view of a section C in FIG. 2(b).

The notch 16 may also be formed by laser processing. In this case, the notch 16 is formed in a mode shown in FIG. 3. That is, a mirror 9 attached to a distal end of a rotational shaft 8 is inserted into the bolt hole 6, and an optical path of laser light from a laser head 10 is bent toward the bolt hole 6 so that the inner circumference of the bolt hole 6 is irradiated with the laser light. Then, by rotating the mirror 9 together with the rotational shaft 8 and applying the laser light so as to go around the inner circumference of the bolt hole 6, the notch 16 that extends continuously along the inner circumference of the bolt hole 6 is formed.

Figure 4A:
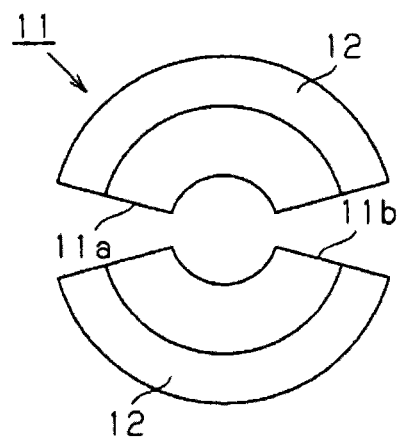
FIG. 4(a) is a cross-sectional plan view showing a split mold adopted in this embodiment.
Figure 4B:
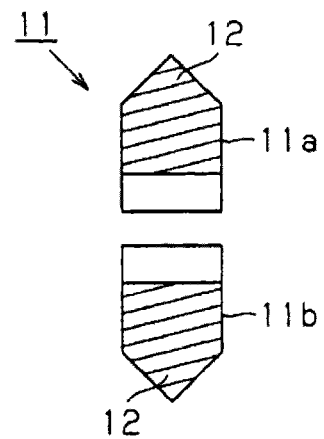
FIG. 4(b) is a cross-sectional side view of the split mold.

In the following Step 2, the split mold 11 as shown in FIG. 4 is inserted into the bolt hole 6. As shown in FIGS. 4(a) and 4(b), the split mold 11 is annular and has wedge-like projections 12 inserted into the notch 16 in its outer circumference. This split mold 11 is divided into two parts 11a, 11b.

Figure 5A:
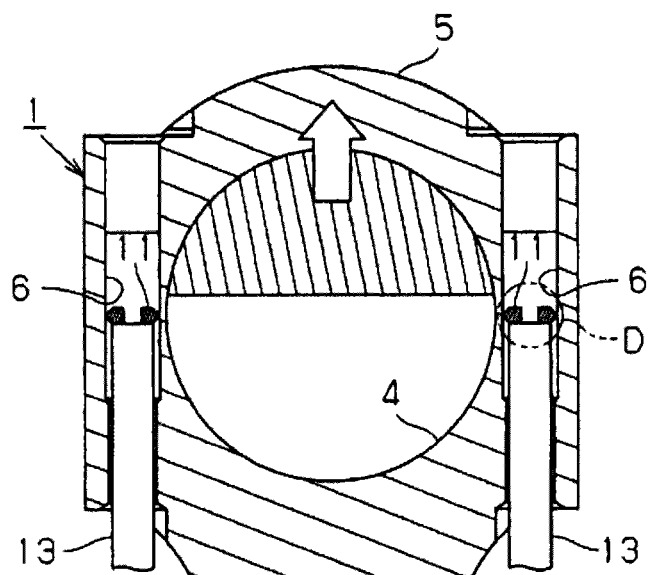
FIG. 5(a) is a cross-sectional view showing a mode of inserting the split mold into a bolt hole in this embodiment.
Figure 5B:
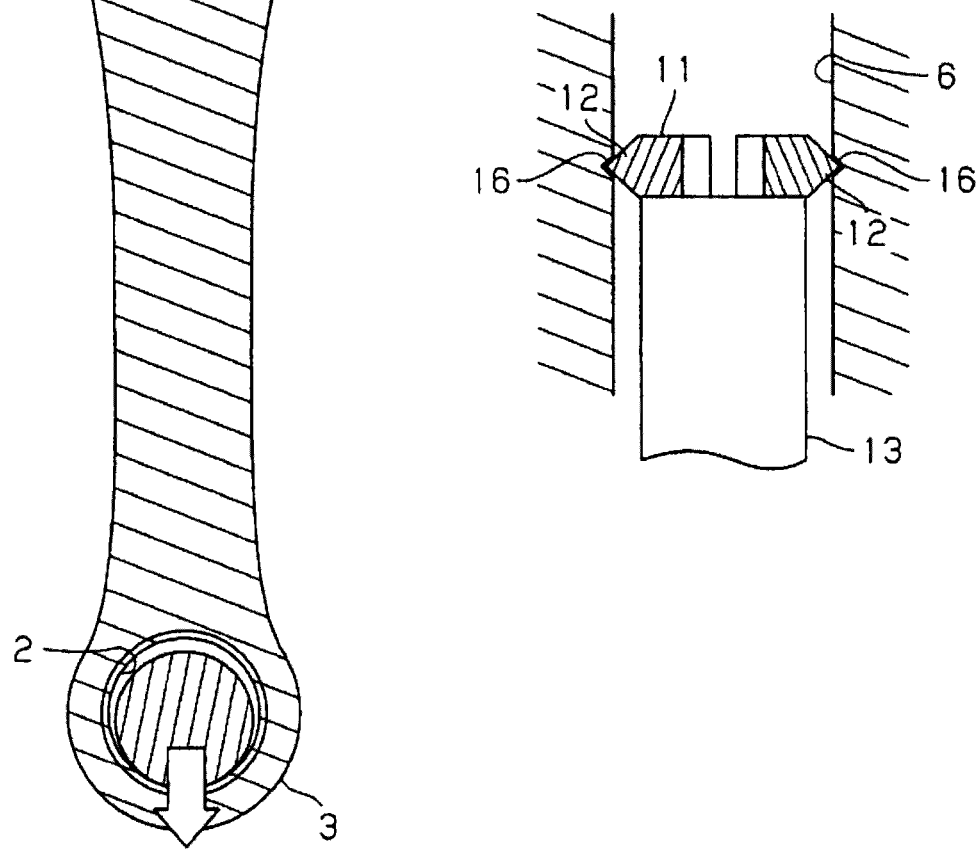
FIG. 5(b) is an enlarged view of a section D in FIG. 5(a)

The split mold 11 is installed in the bolt hole 6 as shown in FIGS. 5(a) and 5(b). That is, the split mold 11 is inserted into the bolt hole 6 while being placed on a support column 13 inserted from an opening of the bolt hole 6, which is shown in a lower section in this drawing. In the following Step 3, a longitudinal pulling force as pre-tension is applied to the connecting rod 1.

Figure 6:
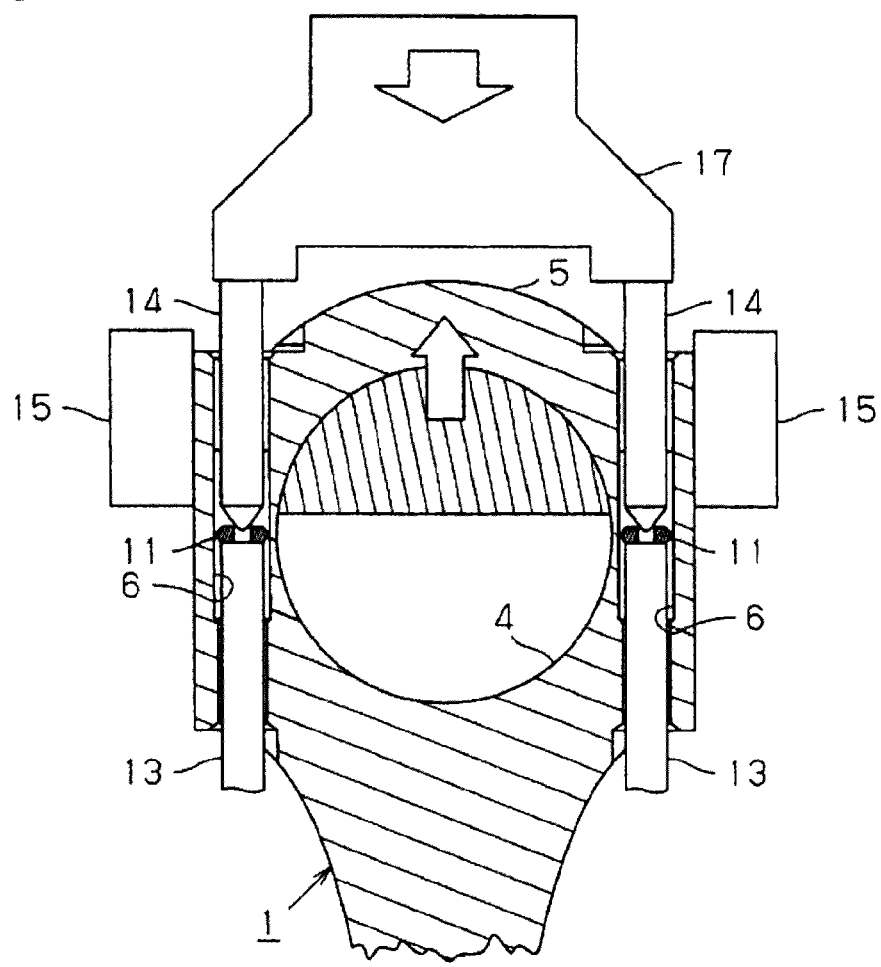
FIG. 6 is a cross-sectional view showing a connecting rod breaking mode in this embodiment.

In the following Step 3, as shown in FIG. 6, a substantially columnar wedge 14 having a wedge-like distal end is inserted from an opening on the opposite side to the opening into which the support column 13 is inserted in a state where both sides of the large end 5 are supported by cap guides 15. Then, by pressing a bottom end of the wedge 14 by a wedge movable pressing portion 17 downward in this drawing, the distal end of the wedge 14 is driven between the two parts 11a, 11b of the split mold 11 to increase the interval between the parts 11a, 11b of the split mold 11, thereby breaking the connecting rod 1 in the large end 5.

When it is attempted to reliably drive the wedge 14 straight, a guide may be arranged about the outer circumference of the wedge 14, and the wedge 14 may be driven with its outer circumference held by the guide.

Figure 7:
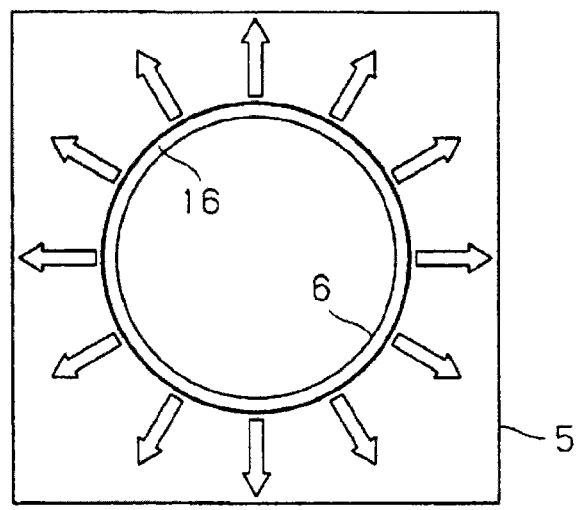
FIG. 7 is a cross-sectional view showing a breakage progress propagating mode in this embodiment.

As shown in FIG. 7, progress of breakage at this time radially propagates from the inner circumference of the bolt hole 6 using the notch 16 in the inner circumference as the starting point. Thus, in breaking at this time, no confluence of breakage propagation exists.

The above-mentioned embodiment achieves following advantages.

(1) In this embodiment, the notch 16 is formed in the inner circumference of the bolt hole 6, which is provided on each side of the large end 5 and into which a bolt for fastening the rod portion and the cap portion is inserted, such that the notch 16 extends continuously along the inner circumference of the bolt hole 6, and progress of breakage propagates using the notch 16 as the starting point to break the connecting rod 1. According to such a breaking method in this embodiment, since progress of breakage radially proceeds from the inner circumference of the bolt hole 6 using the notch 16 formed in the inner circumference as the starting point, no confluence of breakage propagation exists. Therefore, according to the breaking method in this embodiment, the connecting rod 1 can be broken without generating any breaking surface step.

(2) In this embodiment, the connecting rod 1 is broken by the step of forming the notch 16, the step of inserting the split mold 11 into the bolt hole 6, and the step of applying a load to the split mold 11 to press the notch 16 in the radial direction, thereby breaking the connecting rod 1 into the rod portion and the cap portion. In breaking of the connecting rod 1, the annular split mold 11 that has the wedge-like projection 12 inserted into the notch 16 in its outer circumference and is divided into two parts 11a, 11b is used. Then, by driving the wedge 14 between the two parts 11a, 11b, which constitute the split mold 11, to increase the interval between the parts 11a, 11b, the connecting rod 1 is broken. Therefore, using the notch 16 formed in the inner circumference of the bolt hole 6 as the starting point, progress of breakage can proceed radially from the inner circumference more reliably.

Figure 8:
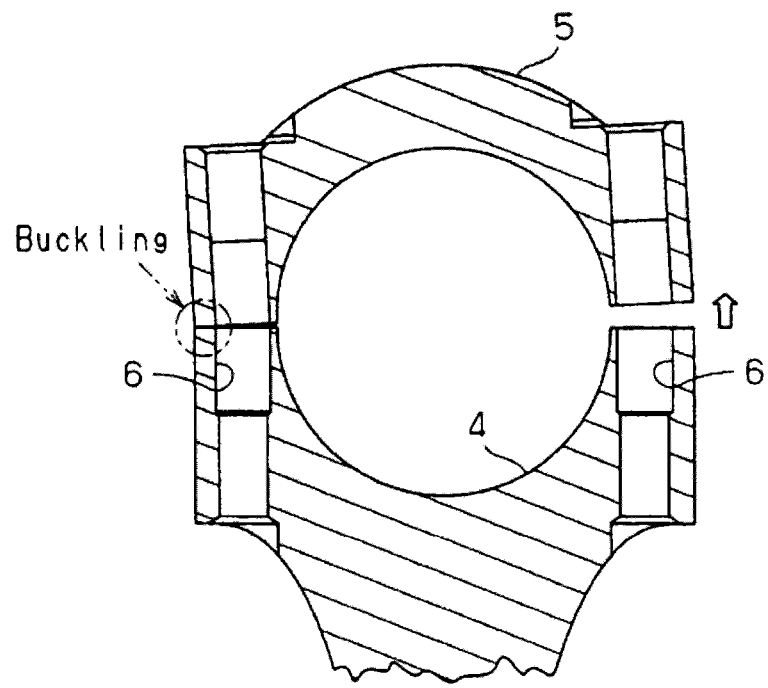
FIG. 8 is a view showing a buckling occurring mode in breaking of the connecting rod.

(3) Breaking of the connecting rod 1 is independently performed on both sides of the large end 5. When there is a time difference between breaking on both sides, as shown in FIG. 8, a first broken region may be opened, causing buckling. In this connection, in this embodiment, since the connecting rod is broken in the state where both sides of the large end 5 are held by the cap guides 15, such buckling is prevented.

Second Embodiment

Figure 9:
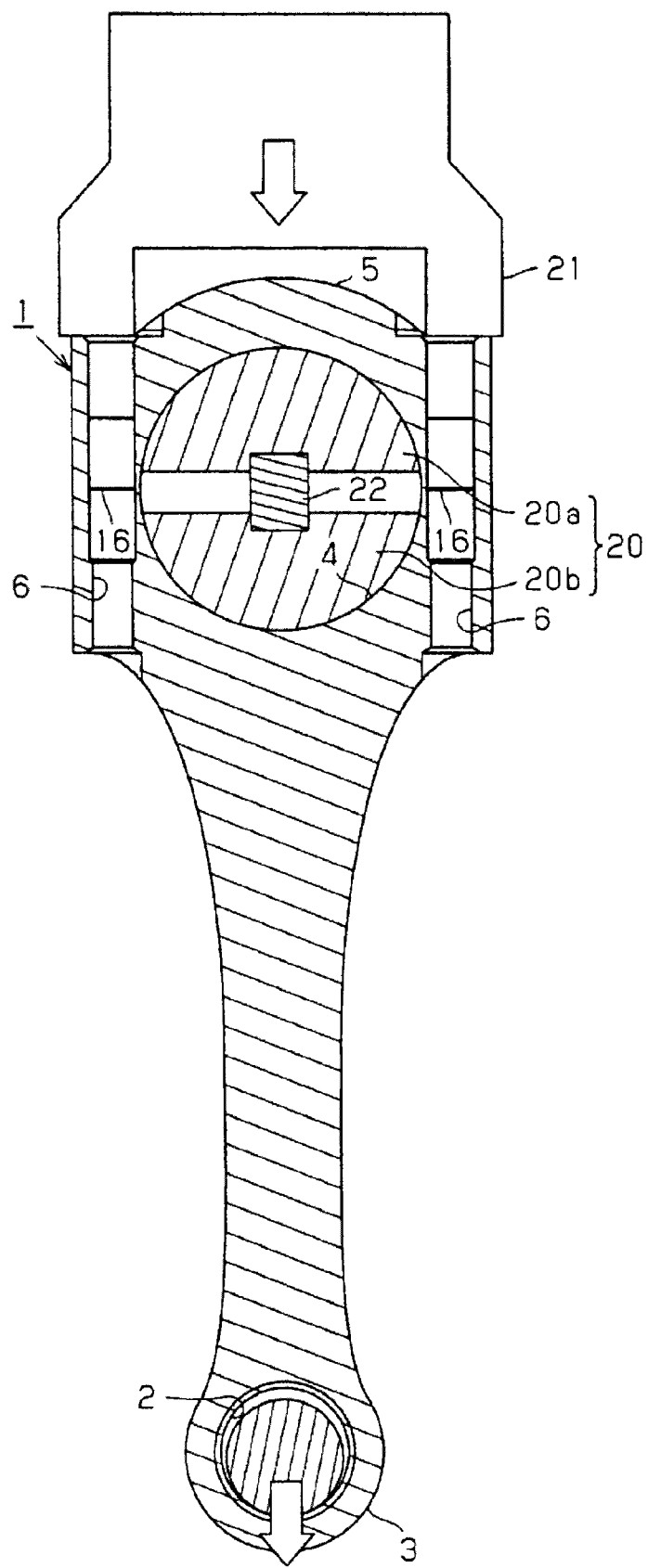
FIG. 9 is a cross-sectional view showing a connecting rod breaking mode in a second embodiment of the present invention.

A connecting rod breaking method according to a second embodiment of the present invention will be described in detail with reference to FIG. 9. In this embodiment, the same configurations as those in the first embodiment are given the same reference numerals and detailed description thereof is omitted.

In this embodiment, as in the first embodiment, a notch 16 that extends continuously along the inner circumference of a bolt hole 6 is formed in the inner circumference. In this embodiment, a connecting rod 1 is broken according to a mode shown in FIG. 9.

That is, in this embodiment, in breaking of the connecting rod 1, a split mold 20 constituted of two semicircular parts 20a, 20b is inserted into the large end hole 4. Then, by pressing the large end 5 of the connecting rod 1 by a guide 21 and driving a wedge 22 between the two parts 20a, 20b of the split mold 20 while applying a pulling force in the longitudinal direction as pre-tension to increase an interval between the two parts 20a, 20b, the connecting rod 1 is broken.

Also in this case, progress of breakage radially propagates outward from the inner circumference of the bolt hole 6 using the notch 16 in the inner circumference as the starting point. For this reason, also in this embodiment, no confluence of breakage propagation exists and therefore, no breaking surface step is generated.

Each of the above-mentioned embodiments can be modified and implemented as follows.

In the first embodiment, the connecting rod 1 is broken in the state where the sides of the large end 5 are held by the cap guides 15. However, as long as breaking can be achieved without generating a time difference between the sides of the large end 5, the cap guides 15 may be omitted.

Figure 10:
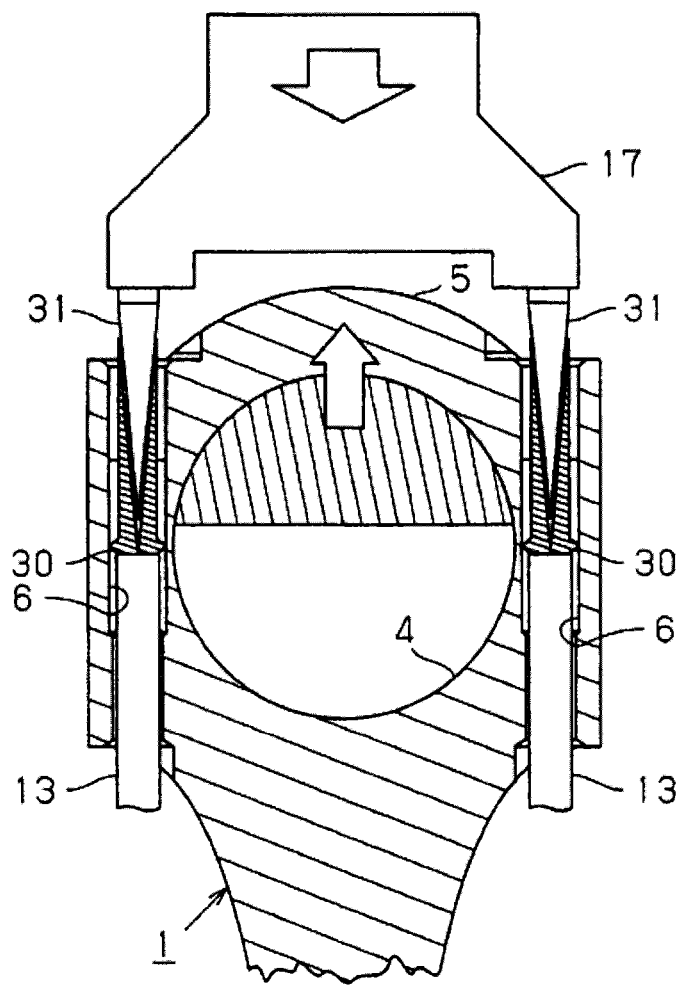
FIG. 10 is a cross-sectional view showing a connecting rod breaking mode in a modification of the first embodiment, in which structures of the split mold and a wedge are changed.
Figure 13:
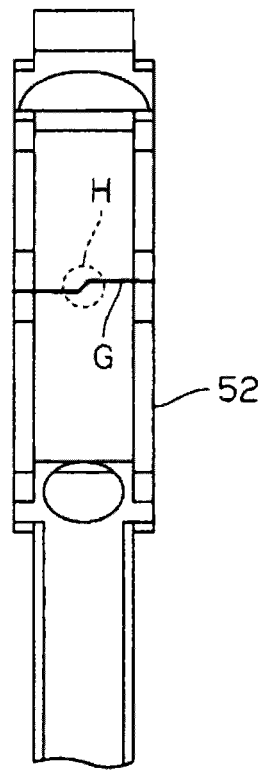
FIG. 13 is a cross-sectional side view showing a large end of a connecting rod having a breaking surface step.

In the first embodiment, the connecting rod 1 is broken by using the two-way split mold 11, which is annular and has the wedge-like projection 12 inserted into the notch 16 in its outer circumference. However, as long as progress of breakage radially propagates using the notch 16 as the starting point, the shape and configuration of the split mold 11 may be appropriately changed. For example, by using a split mold 30 and a wedge 31 as shown in FIG. 10, the connecting rod 1 can be broken without generating any breaking surface step.

Although the connecting rod 1 is broken by driving the wedge in the above-mentioned embodiments, the connecting rod 1 may be broken according to other methods such as by applying a shock load in a pulling direction in a longitudinal direction of the connecting rod 1. Also in this case, when the notch 16 is formed in the inner circumference of the bolt hole 6 so as to extend continuously along the inner circumference and progress of breakage radially propagates using the notch 16 as the starting point to break the connecting rod 1, the confluence of breakage propagation is eliminated, thereby preventing occurrence of the breaking surface step.

DESCRIPTION OF THE REFERENCE NUMERALS

1 . . . Connecting Rod, 2 . . . Small End Hole, 3 . . . Small End, 4 . . . Large End Hole, 5 . . . Large End, 6 . . . Bolt Hole, 7 . . . Single Point Tap, 8 . . . Rotational Shaft, 9 . . . Mirror, 10 . . . Laser Head, 11 . . . Split Mold (11a, 11b: Two parts Constituting A Split Mold), 12 . . . Projection, 13 . . . Support Column, 14 . . . Wedge, 15 . . . Cap Guide, 16 . . . Notch, 17 . . . Wedge Movable Pressing Portion, 20 . . . Split Mold (20a, 20b: Two parts Constituting A Split Mold), 21 . . . Guide, 22 . . . Wedge, 30 . . . Split Mold, 31 . . . Wedge, 50 . . . Split Mold, 51 . . . Split Mold, 52 . . . Connecting Rod, 53 . . . Large End Hole, 54 . . . Wedge, 55 . . . Notch, 56 . . . Large End, 57 . . . Bolt Hole.

The invention claimed is:

1. A method for breaking an integrally molded connecting rod into a rod portion and a cap portion in a large end in which a large end hole is formed, the method comprising:
   forming a notch in an inner circumference of a bolt hole, which is formed on each side of the large end and into which a bolt for fastening the rod portion and the cap portion to each other is inserted, such that the notch extends continuously along all around the inner circumference; and
   performing the breaking by radially propagating progress of breakage from the notch as a starting point, so that no confluence of breakage propagation exists.

2. The connecting rod breaking method according to claim 1, comprising:
   inserting a split mold into each bolt hole; and
   applying a load to the split mold to press the notch in a radial direction, thereby breaking the connecting rod into the rod portion and the cap portion.

3. The connecting rod breaking method according to claim 2, wherein the split mold is annular and has in its outer circumference a wedge-like projection inserted into the notch.

4. The connecting rod breaking method according to claim 3, wherein the split mold is divided into two, the method further comprises driving a wedge between the two parts constituting the split mold to increase an interval between the parts, thereby breaking the connecting rod.

5. The connecting rod breaking method according to claim 1, wherein the connecting rod is broken in a state where the sides of the large end are held by cap guides.

6. The connecting rod breaking method according to claim 1, further comprising:
   inserting a spilt mold into the large end hole;
   pressing the large end with a guide and driving a wedge in the spilt mold while applying a pulling force in the longitudinal direction.

7. The connecting rod breaking method according to claim 6, wherein the split mold includes two semicircular parts that are inserted into the large end hole.

* * * * *